United States Patent
Wu

(12) 
(10) Patent No.: US 6,389,961 B1
(45) Date of Patent: May 21, 2002

(54) GRILL PLATE

(75) Inventor: Tsan-Kuen Wu, Tainan Hsien (TW)

(73) Assignee: Tsann Kuen USA INC, Pasadena, CA (US)

( * ) Notice: Subject to any disclaimer, the term of this patent is extended or adjusted under 35 U.S.C. 154(b) by 0 days.

(21) Appl. No.: 09/935,227

(22) Filed: Aug. 21, 2001

(51) Int. Cl.[7] .......................... A47J 37/00; A47J 37/04; A47J 37/07
(52) U.S. Cl. .............................. 99/339; 99/340; 99/342; 99/400; 99/444; 99/445; 99/446
(58) Field of Search .......................... 99/331, 339, 340, 99/341, 342, 400, 401, 444–450, 481, 482, 483; 126/9 R, 25 R, 41 R; 219/400, 401

(56) References Cited

U.S. PATENT DOCUMENTS

| | | | | |
|---|---|---|---|---|
| 2,253,833 A | * | 8/1941 | Volks | 99/446 |
| 2,413,204 A | * | 12/1946 | Wolff | 99/447 X |
| 3,987,719 A | * | 10/1976 | Kian | 99/422 |
| 4,373,511 A | * | 2/1983 | Miles et al. | 126/25 R |
| 4,800,865 A | * | 1/1989 | Setzer | 99/401 X |
| 4,922,079 A | * | 5/1990 | Bowen et al. | 99/400 X |
| 5,097,753 A | * | 3/1992 | Bowen et al. | 219/401 X |
| 5,107,096 A | * | 4/1992 | Knees | 99/450 X |
| 5,313,877 A | * | 5/1994 | Holland | 99/447 X |
| 5,351,068 A | * | 9/1994 | Muchin | 99/339 X |
| 5,431,091 A | * | 7/1995 | Couture | 99/447 X |
| 5,782,165 A | * | 7/1998 | Glenboski et al. | 99/340 |
| 5,873,300 A | * | 2/1999 | Kuhlman | 99/422 X |

\* cited by examiner

*Primary Examiner*—Timothy F. Simone
(74) *Attorney, Agent, or Firm*—Brinks Hofer Gilson & Lione

(57) ABSTRACT

A grill plate includes a plate body having a central fluid collecting groove between left and right cooking plate portions. The central fluid collecting groove has opposite front and rear ends, and is defined by a groove wall having opposite lateral wall portions that extend upwardly from a groove bottom. The groove bottom inclines downwardly from the front end to the rear end. Each of the left and right cooking plate portions has an outer peripheral edge and an inner edge connected integrally to a respective lateral wall portion, and inclines upwardly from the inner edge to the outer peripheral edge. A surrounding wall extends uprightly from the outer peripheral edges of the left and right cooking plate portions and the groove bottom at the front end to close the latter, and is formed with an opening in fluid communication with the rear end.

16 Claims, 4 Drawing Sheets

GRILL PLATE

BACKGROUND OF THE INVENTION

1. Field of the Invention

The invention relates to a grill plate, more particularly to a grill plate for use with a cooking apparatus.

2. Description of the Related Art

When a conventional grill net is disposed on a heating unit for cooking food thereon, liquid from the food drops via perforations in the grill net, thereby resulting in inconvenience during use. Furthermore, after a period of use, since the conventional grill net can hardly be cleaned, the conventional grill net must be replaced.

SUMMARY OF THE INVENTION

Therefore, the object of the present invention is to provide a grill plate that permits collection of liquid produced during cooking, and that is clear of the aforesaid drawback associated with the prior art.

According to one aspect of the present invention, a grill plate comprises:

a plate body having left and right cooking plate portions, and a central fluid collecting groove between the left and right cooking plate portions, the central fluid collecting groove extending in a longitudinal direction and having a front end and a rear end opposite to the front end in the longitudinal direction, the central fluid collecting groove being defined by a groove wall having a groove bottom and opposite lateral wall portions that extend upwardly from the groove bottom, the groove bottom inclining downwardly in the longitudinal direction from the front end to the rear end, each of the left and right cooking plate portions having an inner edge connected integrally to and extending along a respective one of the lateral wall portions of the groove wall, and an outer peripheral edge, each of the left and right cooking plate portions extending in a transverse direction transverse to the longitudinal direction and away from the other one of the left and right cooking plate portions, each of the left and right cooking plate portions inclining upwardly in the transverse direction from the inner edge to the outer peripheral edge, the plate body further having a surrounding wall that extends uprightly from the outer peripheral edges of the left and right cooking plate portions, that further extends uprightly from the groove bottom at the front end to close the front end of the central fluid collecting groove, and that is formed with an opening in fluid communication with the rear end of the central fluid collecting groove.

According to another aspect of the present invention, a cooking apparatus comprises:

a supporting frame;

a base unit mounted on the supporting frame, and having a lower base portion and an upper base portion;

a heating unit mounted in the lower base portion of the base unit; and a grill plate including:

a plate body having left and right cooking plate portions, and a central fluid collecting groove between the left and right cooking plate portions, the central fluid collecting groove extending in a longitudinal direction and having a front end and a rear end opposite to the front end in the longitudinal direction, the central fluid collecting groove being defined by a groove wall having a groove bottom and opposite lateral wall portions that extend upwardly from the groove bottom, the groove bottom inclining downwardly in the longitudinal direction from the front end to the rear end, each of the left and right cooking plate portions having an inner edge connected integrally to and extending along a respective one of the lateral wall portions of the groove wall, and an outer peripheral edge, each of the left and right cooking plate portions extending in a transverse direction transverse to the longitudinal direction and away from the other one of the left and right cooking plate portions, each of the left and right cooking plate portions inclining upwardly in the transverse direction from the inner edge to the outer peripheral edge, the plate body further having a surrounding wall that extends uprightly from the outer peripheral edges of the left and right cooking plate portions, that further extends uprightly from the groove bottom at the front end to close the front end of the central fluid collecting groove, and that is formed with an opening in fluid communication with the rear end of the central fluid collecting groove, the surrounding wall being mounted on the upper base portion of the base unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
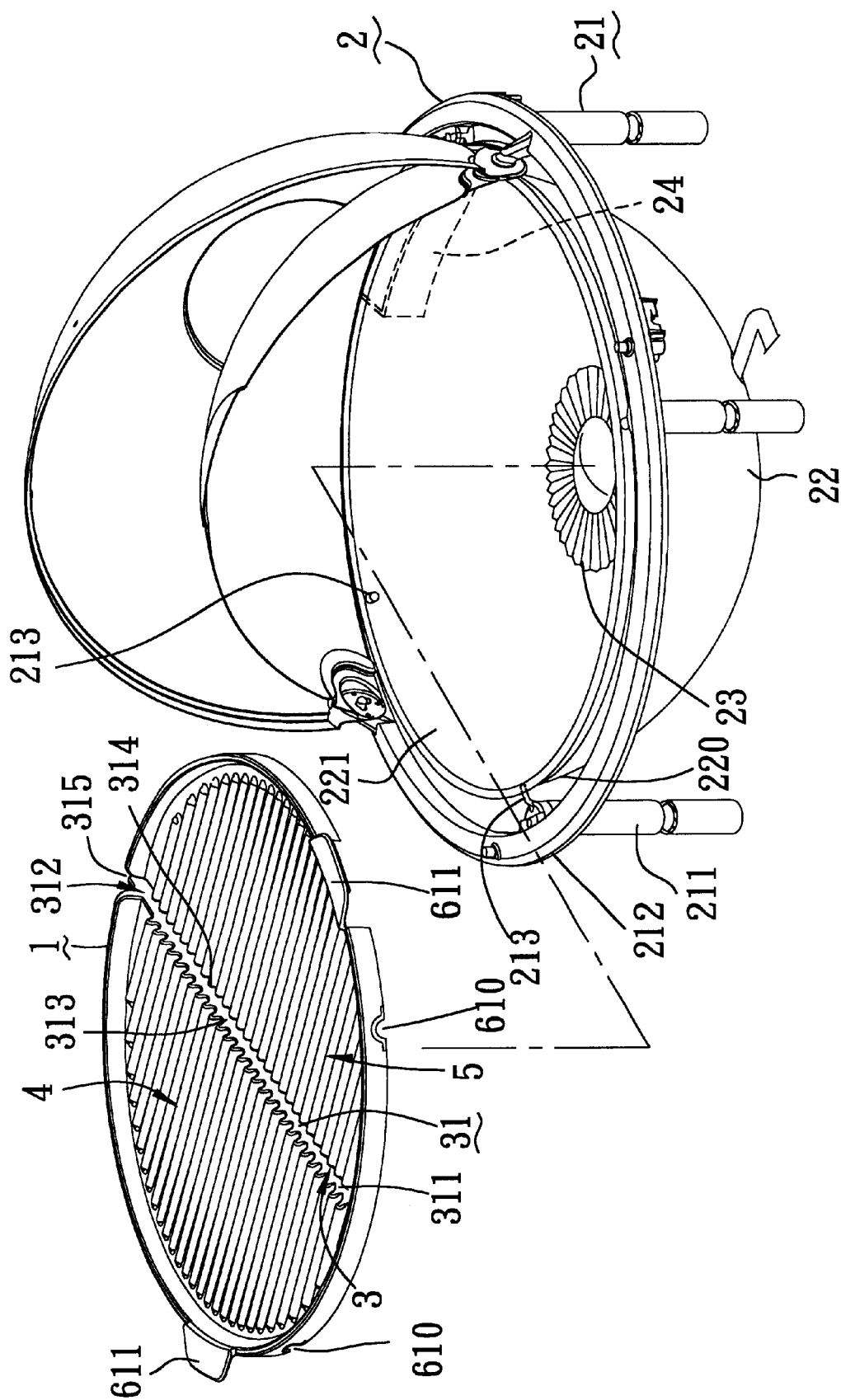
FIG. 1 is a perspective view showing the preferred embodiment of a grill plate for use with a cooking apparatus according to the present invention.
Figure 2:
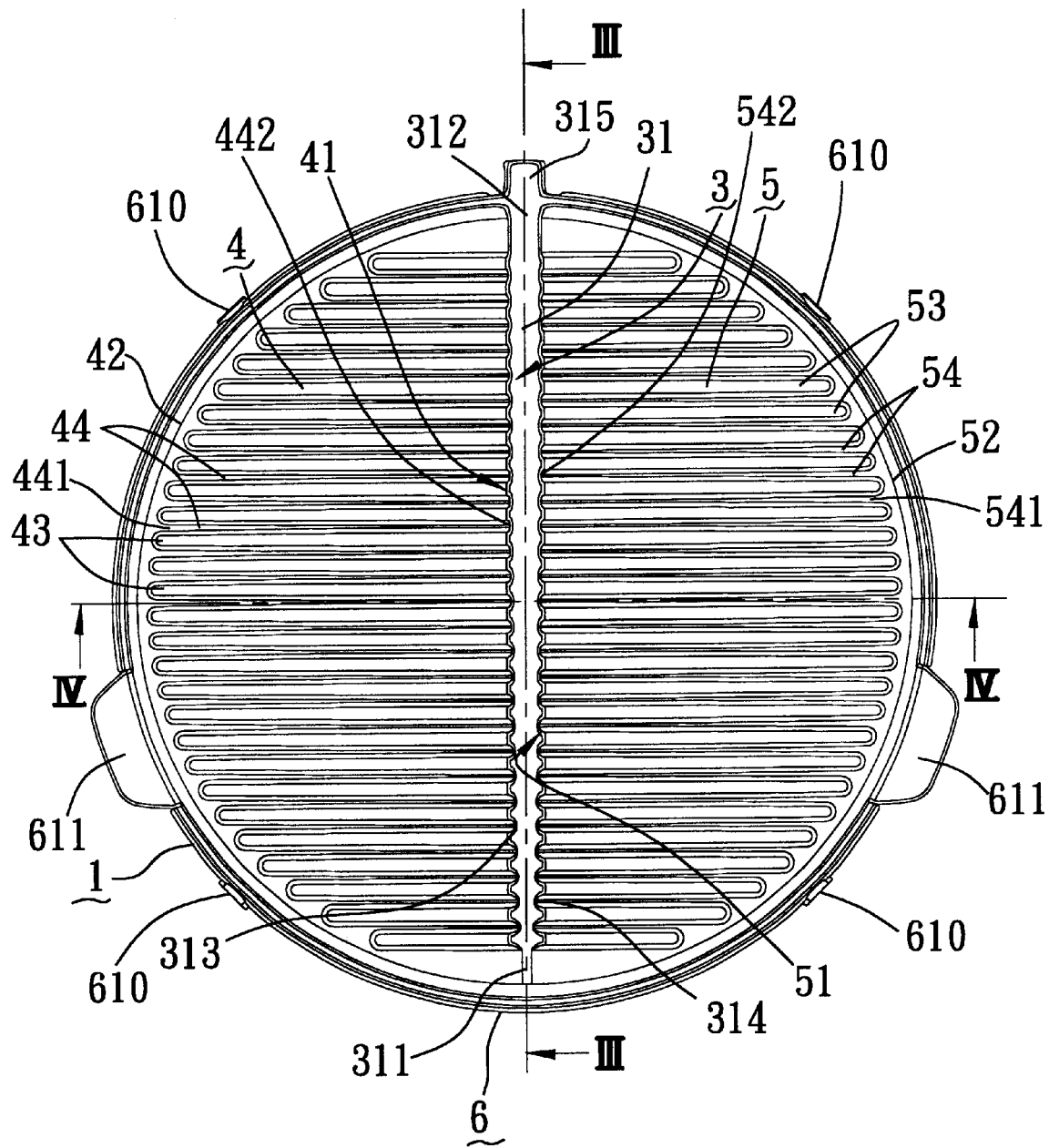
FIG. 2 is a schematic top view of the preferred embodiment.

Referring to FIGS. 1 and 2, according to the preferred embodiment of the present invention, a grill plate 1 is shown to be adapted for use with a cooking apparatus 2. The cooking apparatus 2 includes a supporting frame 21, a semispherical base unit 22, and a heating unit 23. The supporting frame 21 has an annular frame portion 212, and a plurality of supporting legs 211 connected to the annular frame portion 212. Each supporting leg 211 is formed with an engaging stub 213 that extends radially and inwardly. The base unit 22 is mounted on the supporting frame 21, and has a lower base portion and an upper base portion formed with a plurality of engaging holes for extension and retention of a respective one of the engaging stubs 213. The upper base portion has an outer wall surface 220, an inner wall surface 221, and a fluid collecting cup 24 mounted on the outer wall surface 220. The heating unit 23 is mounted in the lower base portion of the base unit 22. In this embodiment, the heating unit 23 is in the form of a gas burner. The grill plate 1 is adapted to be mounted on the base unit 22, and can be heated by the heating unit 23.

Figure 3:
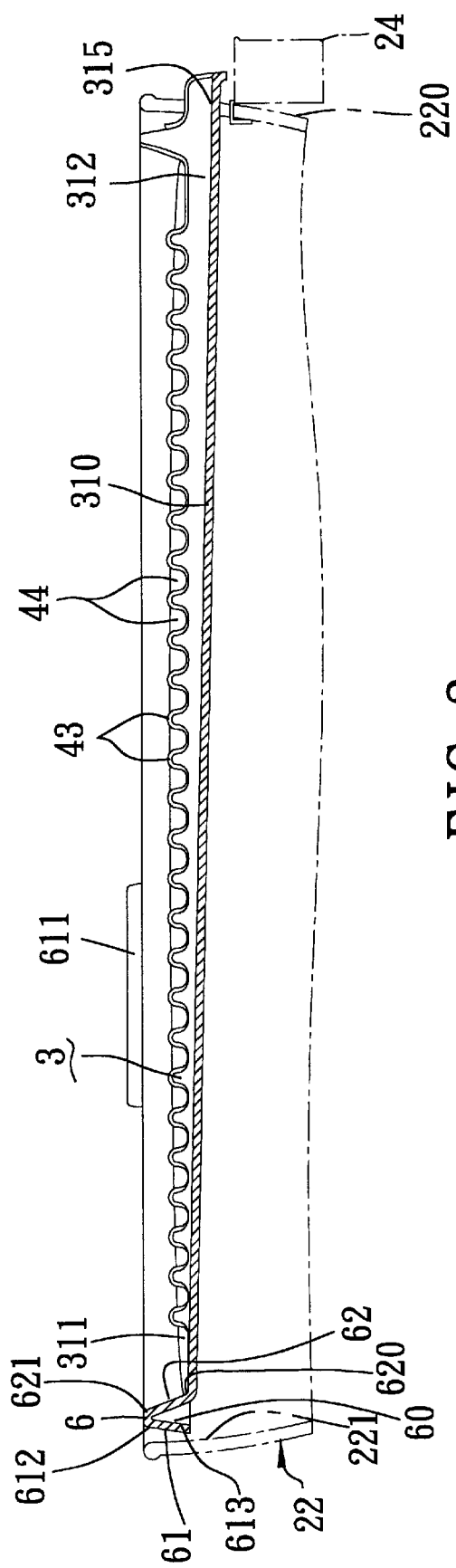
FIG. 3 is a schematic sectional view of the preferred embodiment taken along line III—III in FIG. 2.
Figure 4:
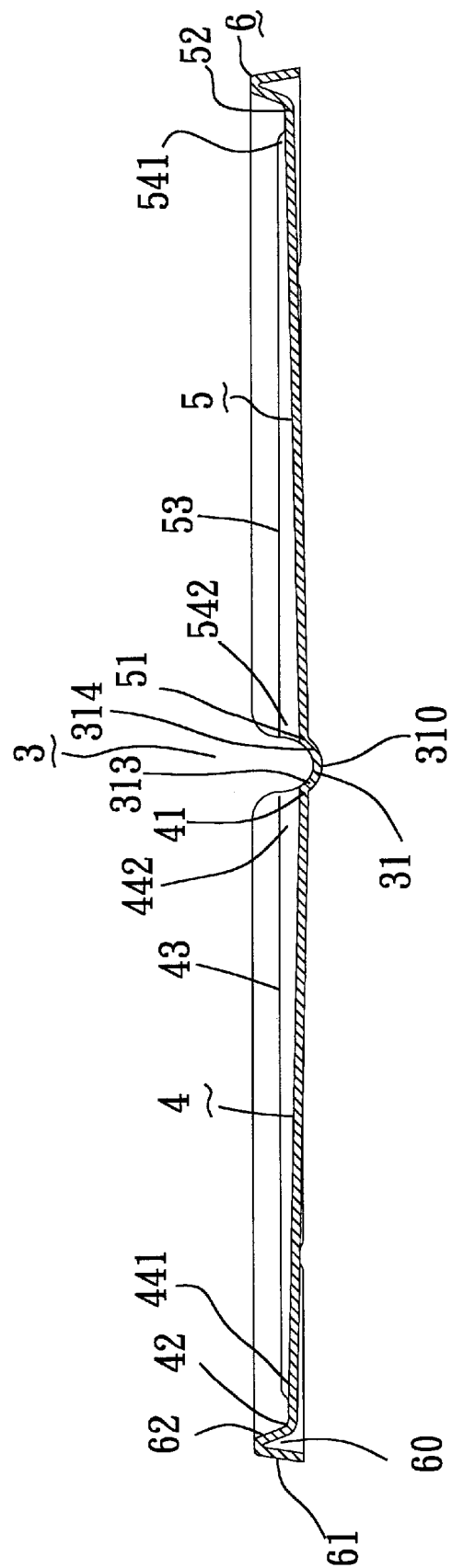
FIG. 4 is a schematic sectional view of the preferred embodiment taken along line IV—IV in FIG. 2.

The grill plate 1 includes a plate body that has left and right cooking plate portions 4, 5, and a central fluid collecting groove 3 between the left and right cooking plate portions 4, 5. The central fluid collecting groove 3 extends in a longitudinal direction, and has a front end 311 and a rear end 312 opposite to the front end 311 in the longitudinal direction. As shown in FIG. 4, the central fluid collecting groove is defined by a groove wall 31 having a groove bottom 310 and opposite lateral wall portions 313, 314 that extend upwardly from the groove bottom 310. As shown in FIG. 3, the groove bottom 310 inclines downwardly in the longitudinal direction from the front end 311 to the rear end 312, and is formed with a downwardly inclined extension spout 315 that extends rearwardly at the rear end 312 of the central fluid collecting groove 3 and that extends toward and above the fluid collecting cup 24. In this embodiment, the central fluid collecting groove 3 forms an angle of 1.6 degrees with respect to a horizontal plane. Preferably, the angle ranges from 1.2 degrees to 2.0 degrees.

As shown in FIGS. 2 and 4, each of the left and right cooking plate portions 4, 5 has an inner edge 41, 51 connected integrally to and extending along a respective one of the lateral wall portions 313, 314 of the groove wall 31, and an outer peripheral edge 42, 52. Each of the left and right cooking plate portions 4, 5 extends in a transverse direction transverse to the longitudinal direction and away from the other one of the left and right cooking plate portions 4, 5. Each of left and right cooking plate portions 4, 5 inclines upwardly in the transverse direction from the inner edge 41, 51 to the outer peripheral edge 42, 52. In this embodiment, each of the left and right cooking plate portions 4, 5 forms an angle of 1.6 degrees with respect to a horizontal plane. Preferably, the angle ranges from 1.2 degrees to 2.0 degrees.

The plate body further has an annular surrounding wall 6 that extends uprightly from the outer peripheral edges 42, 52 of the left and right cooking plate portions 4, 5 (see FIG. 4), that further extends uprightly from the groove bottom 310 at the front end 311 to close the front end 311 of the central fluid collecting groove 3 (see FIG. 3), and that is formed with an opening in fluid communication with the rear end 312 of the central fluid collecting groove 3 (see FIG. 3). As shown in FIGS. 3 and 4, the surrounding wall 6 has an inverted V-shaped cross-section and includes an inner surrounding wall portion 62 with a lower edge 620 connected integrally to the left and right cooking plate portions 4, 5 and an upper edge 621, and an outer surrounding wall portion 61 disposed around the inner surrounding wall portion 62 and having an upper edge 612 connected to the upper edge 621 of the inner surrounding wall portion 62 and a lower edge 613 adapted to be mounted on the upper base portion of the base unit 22. The outer surrounding wall portion 61 cooperates with the inner surrounding wall portion 62 to form an engaging recess 60 therebetween. The lower edge 613 of the outer surrounding wall portion 61 is formed with a plurality of notches 610, each of which enables a respective one of the engaging stubs 213 on the supporting legs 211 to extend into the engaging recess 60.

As shown in FIGS. 2 and 4, each of the left and right cooking plate portions 4, 5 has a cooking surface formed with a plurality of parallel supporting ribs 43, 53 that extend in the transverse direction and that are spaced apart from each other in the longitudinal direction. Adjacent ones of the supporting ribs 43, 53 confine a guiding groove 44, 54 therebetween. The guiding groove 44, 54 has an outer end 441, 541 adjacent to the surrounding wall 6, and an inner end 442, 542 opposite to the outer end 441, 541 in the transverse direction and in fluid communication with the central fluid collecting groove 3. The support ribs 43, 53 have top surfaces that are flush (see FIG. 2). The guiding grooves 44, 54 are shallower at the outer end 441, 541 as compared to the inner end 442, 542 (see FIG. 4).

The plate body further has a plurality of grip portions 611 that extend from the surrounding wall 6.

It is noted that, due to the inclined design of the central fluid collecting groove 3 and the left and right cooking plate portions 4, 5, liquid produced during cooking of the food disposed on the grill plate 1 can be effectively guided to the fluid collecting cup 24 via the guiding grooves 44, 54 and the central fluid collecting groove 3 for collection such that the liquid can be kept away from the heating unit 23. Furthermore, the grill plate 1 of this invention can be easily cleaned, thereby resulting in a relatively long service life. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A grill plate comprising:

a plate body having left and right cooking plate portions, and a central fluid collecting groove between said left and right cooking plate portions, said central fluid collecting groove extending in a longitudinal direction and having a front end and a rear end opposite to said front end in the longitudinal direction, said central fluid collecting groove being defined by a groove wall having a groove bottom and opposite lateral wall portions that extend upwardly from said groove bottom, said groove bottom inclining downwardly in the longitudinal direction from said front end to said rear end, each of said left and right cooking plate portions having an inner edge connected integrally to and extending along a respective one of said lateral wall portions of said groove wall, and an outer peripheral edge, each of said left and right cooking plate portions extending in a transverse direction transverse to the longitudinal direction and away from the other one of said left and right cooking plate portions, each of said left and right cooking plate portions inclining upwardly in the transverse direction from said inner edge to said outer peripheral edge, said plate body further having a surrounding wall that extends uprightly from said outer peripheral edges of said left and right cooking plate portions, that further extends uprightly from said groove bottom at said front end to close said front end of said central fluid collecting groove, and that is formed with an opening in fluid communication with said rear end of said central fluid collecting groove.

2. The grill plate as claimed in claim 1, wherein each of said left and right cooking plate portions has a cooking surface formed with a plurality of parallel supporting ribs that extend in the transverse direction and that are spaced apart from each other in the longitudinal direction, adjacent ones of said supporting ribs confining a guiding groove therebetween, said guiding groove having an outer end adjacent to said surrounding wall and an inner end opposite to said outer end in the transverse direction and in fluid communication with said central fluid collecting groove.

3. The grill plate as claimed in claim 2, wherein said supporting ribs have top surfaces that are flush, said guiding grooves being shallower at said outer end as compared to said inner end.

4. The grill plate as claimed in claim 1, wherein said central fluid collecting groove forms an angle ranging from 1.2 degrees to 2.0 degrees with respect to a horizontal plane.

5. The grill plate as claimed in claim 1, wherein each of said left and right cooking plate portions forms an angle ranging from 1.2 degrees to 2.0 degrees with respect to a horizontal plane.

6. The grill plate as claimed in claim 1, wherein said plate body further has a plurality of grip portions that extend from said surrounding wall.

7. A cooking apparatus comprising:

a supporting frame;

a base unit mounted on said supporting frame, and having a lower base portion and an upper base portion;

a heating unit mounted in said lower base portion of said base unit; and a grill plate including:

a plate body having left and right cooking plate portions, and a central fluid collecting groove between said left and right cooking plate portions, said central fluid collecting groove extending in a longitudinal direction and having a front end and a rear end opposite to said front end in the longitudinal direction, said central fluid collecting groove being defined by a groove wall having a groove bottom and opposite lateral wall portions that extend upwardly from said groove bottom, said groove bottom inclining downwardly in the longitudinal direction from said front end to said rear end, each of said left and right cooking plate portions having an inner edge connected integrally to and extending along a respective one of said lateral wall portions of said groove wall, and an outer peripheral edge, each of said left and right cooking plate portions extending in a transverse direction transverse to the longitudinal direction and away from the other one of said left and right cooking plate portions, each of said left and right cooking plate portions inclining upwardly in the transverse direction from said inner edge to said outer peripheral edge, said plate body further having a surrounding wall that extends uprightly from said outer peripheral edges of said left and right cooking plate portions, that further extends uprightly from said groove bottom at said front end to close said front end of said central fluid collecting groove, and that is formed with an opening in fluid communication with said rear end of said central fluid collecting groove, said surrounding wall being mounted on said upper base portion of said base unit.

8. The cooking apparatus as claimed in claim 7, wherein:

said upper base portion has an outer wall surface and a fluid collecting cup mounted on said outer wall surface;

said groove bottom being formed with a downwardly inclined extension spout that extends rearwardly at said rear end of said central fluid collecting groove and that extends toward and above said fluid collecting cup.

9. The cooking apparatus as claimed in claim 7, wherein said surrounding wall has an inverted V-shaped cross-section and includes an inner surrounding wall portion with a lower edge connected integrally to said left and right cooking plate portions and an upper edge, and an outer surrounding wall portion disposed around said inner surrounding wall portion and having an upper edge connected to said upper edge of said inner surrounding wall portion and a lower edge mounted on said upper base portion of said base unit.

10. The cooking apparatus as claimed in claim 9, wherein said upper base portion has an inner wall surface provided with a plurality of engaging stubs, said outer surrounding wall portion cooperating with said inner surrounding wall portion to form an engaging recess therebetween, said lower edge of said outer surrounding wall portion being formed with a plurality of notches, each of which enables a respective one of said engaging stubs to extend in-to said engaging recess.

11. The cooking apparatus as claimed in claim 7, wherein each of said left and right cooking plate portions has a cooking surface formed with a plurality of parallel supporting ribs that extend in the transverse direction and that are spaced apart from each other in the longitudinal direction, adjacent ones of said supporting ribs confining a guiding groove therebetween, said guiding groove having an outer end adjacent to said surrounding wall and an inner end opposite to said outer end in the transverse direction and in fluid communication with said central fluid collecting groove.

12. The cooking apparatus as claimed in claim 11, wherein said supporting ribs have top surfaces that are flush, said guiding grooves being shallower at said outer end as compared to said inner end.

13. The cooking apparatus as claimed in claim 7, wherein said central fluid collecting groove forms an angle ranging from 1.2 degrees to 2.0 degrees with respect to a horizontal plane.

14. The cooking apparatus as claimed in claim 7, wherein each of said left and right cooking plate portions forms an angle ranging from 1.2 degrees to 2.0 degrees with respect to a horizontal plane.

15. The cooking apparatus as claimed in claim 7, wherein said plate body further has a plurality of grip portions that extend from said surrounding wall.

16. The cooking apparatus as claimed in claim 7, wherein said heating unit includes a gas burner.

* * * * *